Aug. 14, 1934.  W. H. DE LANCEY  1,970,361
LIQUID DISPENSING APPARATUS
Filed March 9, 1933   4 Sheets-Sheet 1
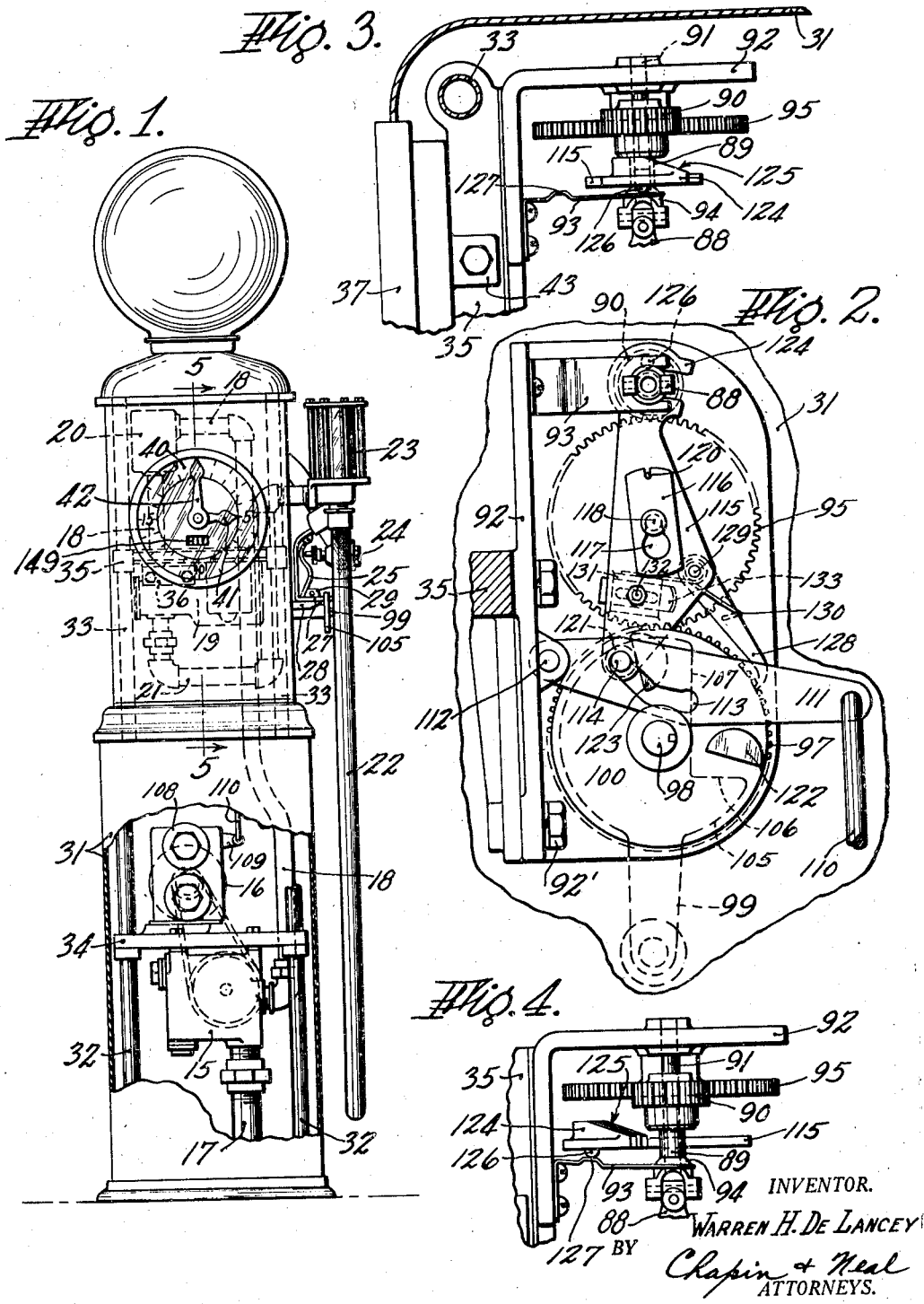

Aug. 14, 1934.  W. H. DE LANCEY  1,970,361
LIQUID DISPENSING APPARATUS
Filed March 9, 1933   4 Sheets-Sheet 2

INVENTOR.
WARREN H. DE LANCEY
BY Chapin & Neal
ATTORNEYS.

Aug. 14, 1934.    W. H. DE LANCEY    1,970,361
LIQUID DISPENSING APPARATUS
Filed March 9, 1933    4 Sheets-Sheet 3
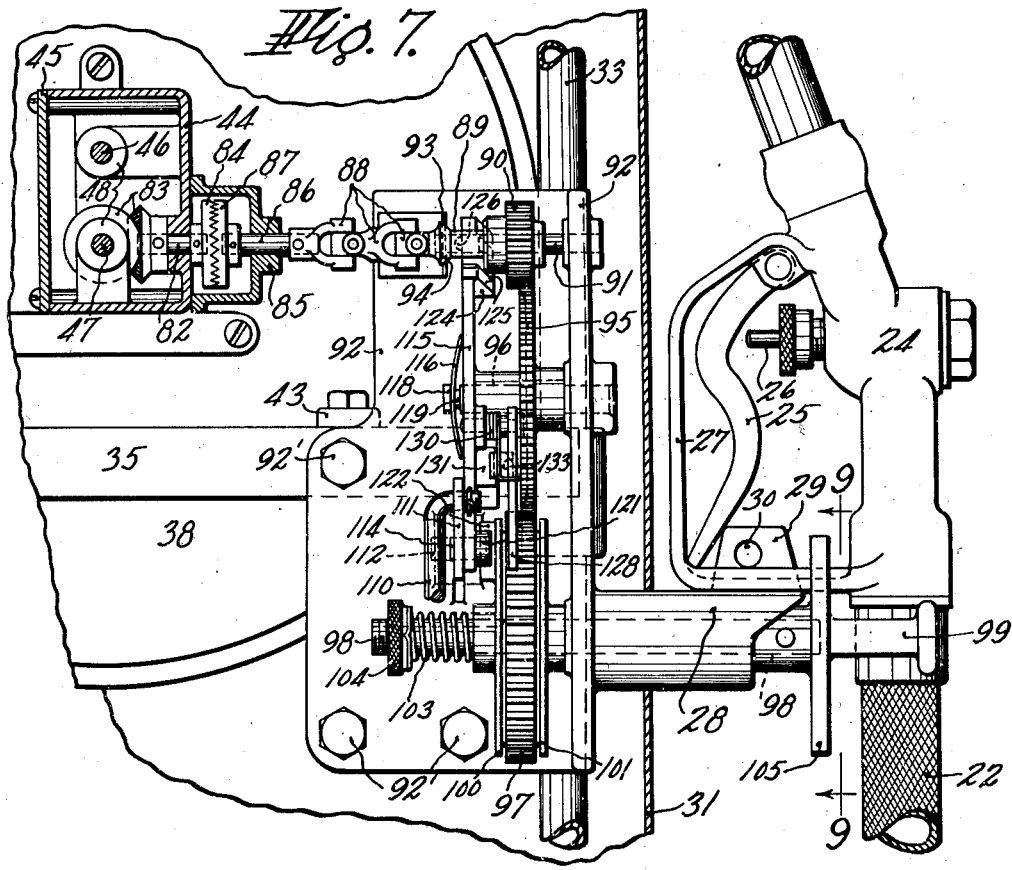
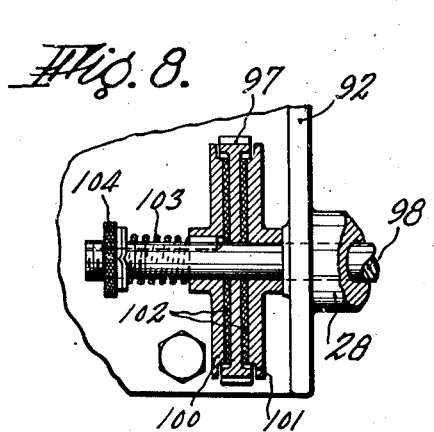
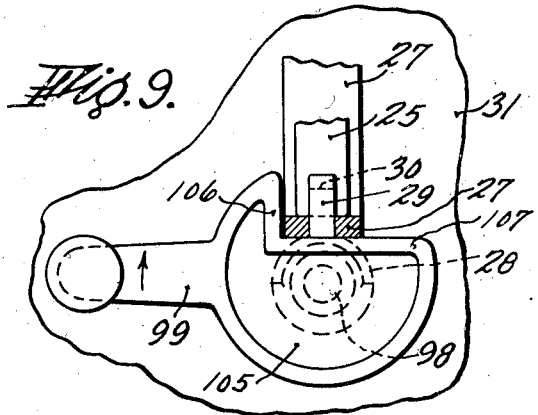
INVENTOR.
WARREN H. DE LANCEY
BY Chapin + Neal
ATTORNEYS.

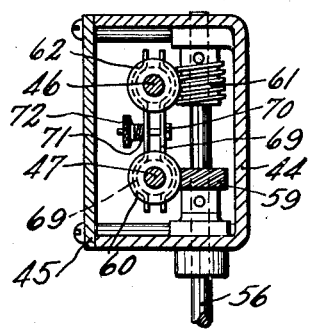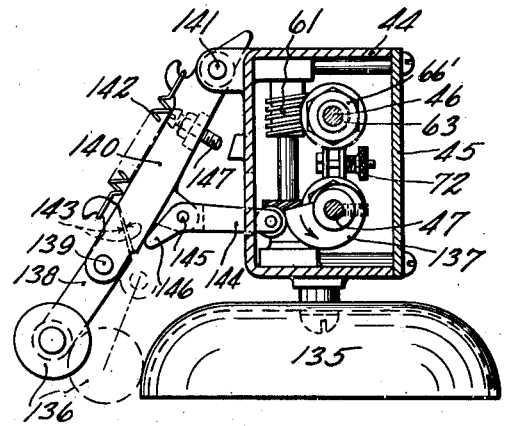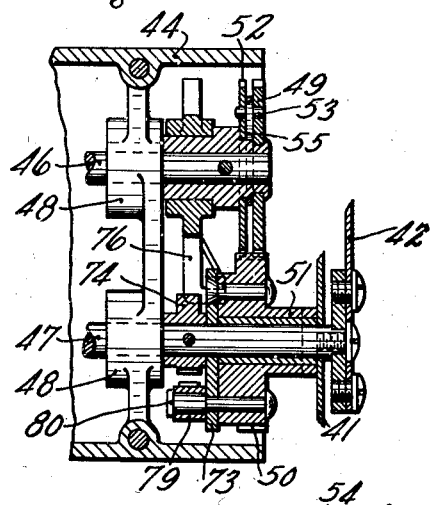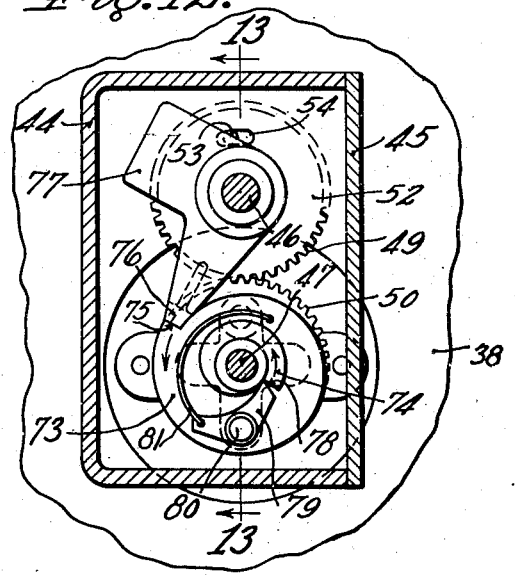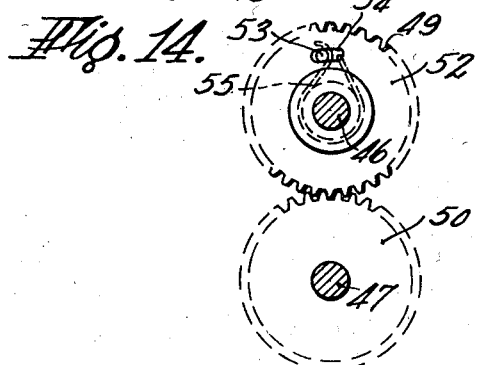

Patented Aug. 14, 1934

1,970,361

UNITED STATES PATENT OFFICE

1,970,361

LIQUID DISPENSING APPARATUS

Warren H. De Lancey, Springfield, Mass., assignor to Gilbert & Barker Manufacturing Company, West Springfield, Mass., a corporation of Massachusetts Application March 9, 1933, Serial No. 660,133

9 Claims. (Cl. 221—95)

This invention relates to improvements in liquid dispensing apparatus of the general type wherein the liquid dispensed is forced through a conduit, having interposed therein a meter, and delivered through a flexible hose having a nozzle at its delivery end. The measured quantities dispensed are indicated on the dial of a register by a movable indicating element driven by the meter. Apparatus of this type is commonly used for dispensing gasoline, oils and the like.

The general problem, for which this invention offers one solution, is that of compelling the resetting of the movable indicating element of the register to zero position before the pump or other means used to force liquid through the liquid delivery conduit can be operated.

An object of the invention is to provide a satisfactory solution of this problem in a dispensing apparatus having as its normal control element for the liquid forcing means, an ordinary hand operated device, such for example as a switch which starts and stops the motor of the pump, and to provide for such an interrelationship between this element and the register resetting means and the support on which the hose nozzle is hung up when not in use, as will compel the operator to reset the register just prior to the start of each dispensing operation, thereby insuring a cleared register and preventing perpetration of fraud on the customer.

More particularly, the invention provides a hose nozzle support located adjacent the path of movement of the control element and arranged so that the nozzle, when in place on the support, blocks movement of said element and holds it in "Off" position and also arranged so that the control element, when otherwise positioned, prevents the placing of the nozzle on the support. This element is utilized to actuate the register resetting means during its movement toward the position in which it starts the liquid pumping means. Resetting is thus effected by the act of the operator in starting the pump. Moreover, the hose nozzle cannot be hung on its support until the control element has been moved to "Off" position and the movement of such element to such position is utilized to again render the resetting means effective to perform its function and prevent operation of the pump until the resetting means has again been operated.

Another object of the invention is to provide means for preventing the movable indicating element of the register, after having been reset to zero position, from springing away from such position as frequently happens after the resetting means has been disconnected, because of the relief of the stress applied to the parts of the resetting transmission at the end of the resetting operation.

Another object of the invention is to provide an improved interrelationship between the clutch operating means of the resetting transmission and the means for operating the motor switch,—the arrangement being such that the clutch elements cannot be engaged until after the motor switch has been opened and being characterized by preventing any such fraudulent manipulation of the apparatus as would enable the delivery of liquid without operation of the register.

Other objects will appear as the detailed description proceeds and will be pointed out in the appended claims.

The invention will be disclosed with reference to the accompanying drawings, in which:

Fig. 1 is a small scale, front elevational view, partly in section, of a gasoline dispensing apparatus embodying the invention;

Fig. 2 is a fragmentary cross sectional view showing the control device (in "On" position) and register resetting means;

Figs. 3 and 4 are fragmentary plan views of the mechanism shown in Fig. 2, illustrative of the clutch operating means and showing such means in clutch-disengaging and clutch-engaging positions, respectively;

Fig. 7 is a sectional view taken on the line 7—7 of Fig. 5;

Fig. 8 is a detail sectional view of the friction drive between the pump control device and the register resetting gearing;

Fig. 9 is a view taken on the line 9—9 of Fig. 7 and shows the pump control device lever and its relationship with the hose nozzle support;

Figure 5:
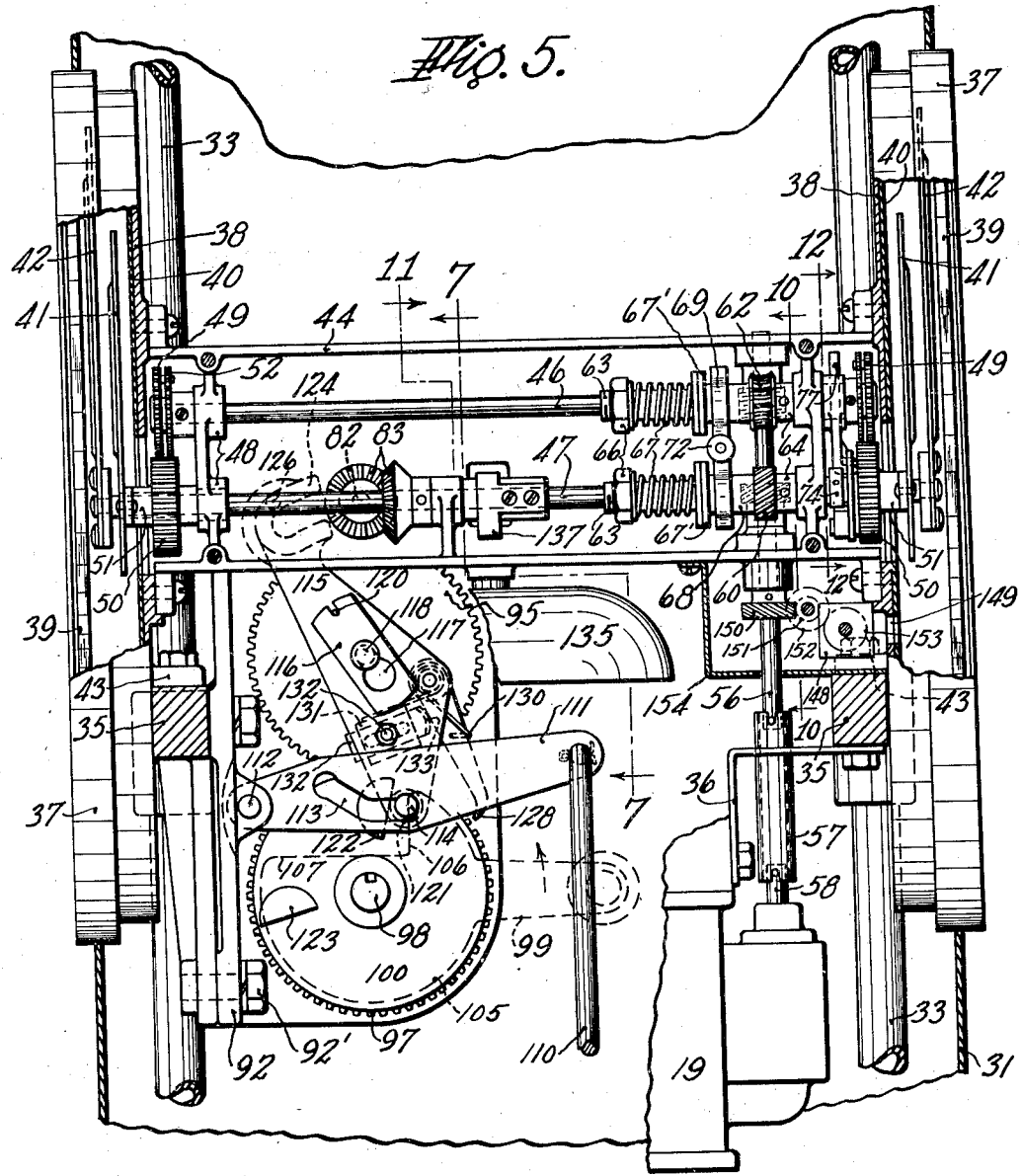
Fig. 5 is a fragmentary cross sectional view taken on the line 5—5 of Fig. 1 showing the registers, the driving means therefor, the control device (in "Off" position) and the register resetting means.

Figs. 10, 11 and 12 are sectional views taken on the lines 10—10, 11—11 and 12—12, respectively, of Fig. 5;

Fig. 13 is a sectional view taken on the line 13—13 of Fig. 12; and

Fig. 14 is a detail view of the register driving gears showing the means for taking up all lost motion therebetween.

Referring first to Fig. 1 of these drawings;

there is shown more or less in conventional form, a power-driven gasoline dispensing apparatus of the so-called meter type. A suitable rotary pump 15, driven by an electric motor 16, draws gasoline through a suction pipe 17 from a suitable storage tank (not shown) and forces the liquid upwardly through piping 18 to a suitable meter 19. Interposed in piping 18 may be a device 20 for freeing the liquid of air just prior to the entrance of the liquid to the meter. The outlet of the meter is connected by piping 21 to a flexible hose 22, usually through the intermediary of a sight flow indicator 23. On the delivery end of the hose is a nozzle 24 (best shown in Fig. 7) having the usual self closing valve and an operating lever 25 which, when moved to the right from the position shown, will engage and move the stem 26 of the nozzle valve and open the latter. The nozzle 24 also has a guard 27 for lever 25. When not in use, the nozzle is hung up by resting the lower portion of this guard 27 upon a fixed, shelf-like support 28 having an upstanding lug 29 which passes through a slot in such portion, as best shown in Fig. 7, and holds the nozzle against displacement on its support in all directions other than vertically upward. The lug 29 is perforated as at 30, to receive a padlock whereby the nozzle may be locked to its support. The lug 29 may if desired serve also to block an opening movement of the valve lever 25 while the nozzle is hung up on its support as will be clear from Fig. 7.

The apparatus, except for the hose, its nozzle, the nozzle support, indicator 23 and a control member later to be described, is usually enclosed in a suitable housing such as the sheet metal casing 31. Within this housing is a suitable supporting frame and, as herein shown, this frame includes lower and upper series of vertically disposed pipe columns 32 and 33, respectively. To the columns 32 is fixed a plate 34 supporting both the pump and motor. To the upper columns 33 are fixed two cross bars 35, one of which is shown completely in Fig. 1 and both of which appear in section in Fig. 5. These bars 35 serve to support the meter 19, as indicated in part by the brackets 36 (Figs. 1 and 5). They also support the registers and the driving and resetting means therefor.

One or more registers are provided to indicate the quantities of liquid dispensed. As shown in Fig. 5, two registers are provided, one on each of two opposite sides of the apparatus. Each register includes a short cylindrical casing 37, mounted in an opening in housing 31. Each casing 37 has a solid inner wall 38 and its outer wall 39 is transparent. Within the casing 37 is fixed a dial 40, having inner and outer series of graduations (Fig. 1) with which indicating hands 41 and 42, respectively, cooperate. The long hand 42 is intended to make one complete revolution for each unit quantity dispensed, while the short hand shows on the inner graduated scale the number of such unit quantities dispensed.

Figure 6:
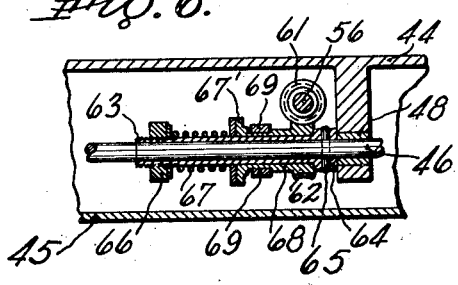
Fig. 6 is a detail sectional view of one of the register driving gears and the clutch associated therewith.

On the rear wall 38 of each register are lugs 43, which rest upon and are bolted to the adjacent cross bar 35 (Figs. 3, 5 and 7). Extending between the two walls 38 and secured at its ends, one to each such wall, is a horizontally disposed cross member 44 of channel-shaped cross section. A cover plate 45 (Fig. 7), secured as indicated to member 44, cooperates therewith to form a housing for most of the register driving mechanism. This mechanism is largely of the conventional type. It includes upper and lower horizontally-disposed shafts 46 and 47, mounted within the housing and in bearings 48 provided therein near each end thereof. The lower shaft 47 extends through the rear wall 38 of each register casing to drive the hands 42 which are fixed one to each end of the shaft. The upper shaft 46 terminates short of such walls and has fixed to each end in the manner shown in Fig. 13 a gear 49 which drives an underlying gear 50. Gear 50 is part of a sleeve 51 which is mounted to turn freely on shaft 47 and has fixed thereto the indicator hand 41. Preferably each gear 49 has associated therewith a second gear 52 of the same diameter and pitch. Each gear 52 is free to turn on shaft 46 to a limited extent. As shown in Figs. 12, 13 and 14, a pin 53 on gear 49 passes through an arcuate slot 54 in gear 52 which slot limits the extent of relative movement of the gears. A spring 55 interconnecting the two gears and acting between pin 53 and one end of slot 54, tends to swing them apart so that their teeth do not line up. This arrangement is the usual one for taking up all backlash in the driving connections between shaft 46 and sleeve 51. Shafts 46 and 47 are driven from a vertical shaft 56 but at different rates and in opposite directions. As shown, the shaft 46 is driven at one twentieth the rate at which shaft 47 is driven. Shaft 56 is mounted in bearings in the upper and lower flanges of member 44 and its lower end is connected by a suitable flexible coupling 57 with the driven shaft 58 of meter 19. Fixed to shaft 56 (Fig. 10) is a spiral gear 59 which drives a similar gear 60 on shaft 47, and a worm 61 which drives a worm gear 62 on shaft 46. Gears 60 and 62 are connected to their respective shafts in the manner shown in Fig. 6 in connection with gear 62. Such gear is free to turn on a sleeve 63. One end of this sleeve has a flange 64 which is pinned at 65 to shaft 46. The other end of sleeve 63 is threaded to receive a nut 66. A spring 67, coiled around sleeve 63 acts between the adjustable abutment 66 and a flange 67' on the hub 68 of gear 62 to press the latter against collar 64. The gear 62 thus drives shaft 46 through the intermediary of a friction clutch and the gear 60 drives its shaft 47 in the same way. This enables both shafts 46 and 47 to be turned to reset hands 41 and 42 to zero without turning the gears 60 and 62 and shaft 56. The hub 68 is grooved (Fig. 6) to receive the substantially semi-circular ends of two friction plates 69. These plates are drawn together by a bolt 70 (Fig. 10) and nut 72, the latter acting on one plate 69 through the intermediary of a spring 71. This pair of plates acts as a friction drag for both gears 60 and 62. By having the friction device act on the gears rather than the shafts driven thereby, resetting of the pointers is accomplished with less effort because the shafts only need to be turned for this purpose and they are free from the drag of the friction device.

Zero stops are provided for each of the indicator hands. As shown in Figs. 12 and 13, one of the gears 50 has fixed to one side thereof a cam 73 and adjacent thereto and fixed to shaft 47 is a similar but smaller cam 74. The arrows shown in Fig. 12 indicate the direction of travel of the cams while being driven by the meter shaft 56. Shaft 47 will be turned in the opposite direction by means later to be described, to reset the hands to zero. When the hands are both at zero, the abrupt radial face 75 of cam 73 will be engaged by the end of a pawl 76, mounted to turn freely on shaft 46 and constantly urged by its weighted extension 77 into engagement with the spirally-shaped surface of the cam. Also, the corresponding face 78 of the correspondingly formed cam 74 will be engaged by the free end of a pawl 79, pivoted at 80 to gear 50 and urged by a spring 81 into engagement with the spiral surface of the cam. During operation of the meter, shaft 47 will turn in a counterclockwise direction, as viewed in Fig. 12, and the face 78 of cam 74 will move away from pawl 79. Gear 50 will also turn in the same direction but at a slower speed and thus will carry the face 75 of cam 73 away from pawl 76. Shaft 47 will usually make several revolutions and the nature of cam 74 is such that it can do so. The cam 73 is similarly constructed for similar reasons although the indicator hand 41 will rarely make more than one complete revolution. The resetting of the hands is effected by turning shaft 47 in a direction opposite to that indicated by the arrows in Fig. 12. The first action is to turn cam 74 and thus the indicator 42 without moving gear 50 or the indicator 41. This action continues until the face 78 of cam 74 engages the free end of pawl 79, whereupon the gear 50 will be turned with shaft 47. On continued turning of shaft 47 in the same direction, gear 50 will be moved until the cam face 75 is arrested by the abutment with the free end of pawl 76. Both hands 41 and 42 will then be restored to zero position.

For convenience in turning shaft 47 from outside the pump casing the following mechanism is provided. A short shaft 82 (Fig. 7) is mounted in the rear wall of member 44. One end of this shaft is connected by bevel gears 83 to shaft 47 and the other end has fixed thereto a clutch element 84. Mounted for rotation and also for limited axial movement in a bearing 85 fixed to member 44, is a second short shaft 86, aligned with shaft 82 and having fixed thereto a clutch element 87 to cooperate with element 84. Shaft 86 is connected by the universal couplings 88 to a third short shaft 89 which is in the form of a sleeve integral with one of the couplings 88 and having fixed thereto a pinion 90. This sleeve 89 is telescoped over a stud 91 fixed to a frame 92 and the sleeve can turn as well as slide axially on this guiding stud. Frame 92 is secured by cap screws 92' to cross bar 35. A flat spring 93, fixed to frame 92 has its free end forked to straddle sleeve 89 and cooperate, as will later appear, with a partly spherical surface 94 formed on the sleeve, to force the clutch element 87 into engagement with its mating element 84. When the clutch elements are engaged, shaft 47 can be turned from pinion 90. The latter is driven by a much larger spur gear 95, mounted to turn freely on a stud 96, fixed to frame 92. Gear 95 is driven by a gear 97 mounted near one end of a shaft 98 which extends outwardly through a bearing in frame 92 to a position underlying the hose nozzle supporting shelf 28. Shaft 98 has fixed to its outer end an operating handle 99. Gear 97 is frictionally driven from shaft 98 in the manner shown in Fig. 8. This gear is free to turn on shaft 98 and is mounted between inner and outer face plates 100 and 101, the former being slidably keyed to the shaft and the latter free to turn thereon. The face plates have suitable friction surfaces 102 to bear against gear 97. A spring 103 acting against an adjustable abutment 104 on shaft 98 presses plate 100 against gear 97 and the latter against plate 101 and the hub of plate 101 against the frame 92. Consequently, after handle 99 has been turned enough to restore both indicator hands to zero position, the handle may be moved still further in the same direction, the face plate 100 slipping over the adjacent face of gear 97 without turning the same. The gearing between shafts 98 and 89 is such that approximately three-quarters of a revolution of the former will be capable of producing at least two complete revolutions of shaft 89. Two revolutions of shaft 89 will suffice to reset both indicator hands under any condition and usually shaft 89 will not need to be turned as much, in which case plate 100 will then slip on gear 97 to allow full travel of handle 99.

The handle 99 has a flange 105 thereon, which flange is of generally circular form except for a single recess therein having right angularly disposed walls 106 and 107. This flange is located just beyond the outer end of the nozzle support 28 and, when the nozzle is removed, the handle 99 can be freely turned but when the nozzle is in place as shown, movement of the handle is blocked by the abutment of wall 106 with that part of the nozzle guard 27 which projects beyond the support 28. The single recess in flange 105 allows the nozzle 24 to be placed on its support 28 only when handle 99 is moved into the position shown in Figs. 5, 7 and 9. At all other positions of handle 99, the flange 106 prevents the nozzle from being put in place on the support. It is intended that the handle 99 shall move from the "Off" position shown in Figs. 5, 7 and 9 to the "On" position indicated in Fig. 2, or through an angle of substantially 270 degrees.

When the control handle 99 is in "Off" position, the clutch elements 84 and 87 are engaged. Therefore, when this handle is turned after removal of the nozzle 24 from its support 28, in the direction of the arrows shown in Figs. 5 and 9, the first action will be to turn gear 97 and through the chain of connecting elements described, to turn shaft 47 in the proper direction to reset the indicator hands to zero. When these hands reach zero position, the travel of gear 97 will be arrested and handle 99 can continue to move because the clutch plate 100 will slip on this gear. To compel the operator to continue the movement of handle 99 to the intended limit, the handle is arranged to control the pump motor 16 and cause it to be started only at the very end of the intended range of movement or in other words when the handle is positioned as in Fig. 2. The handle is also arranged to cause disengagement of the clutch elements 84 and 87 just prior to the closing of the motor switch.

The motor switch (not shown) is mounted within a box 108 (Fig. 1) and operated by an arm 109 to which is connected a link 110. As shown in Fig. 5, this link connects with the outer end of a lever 111, pivoted at 112 to frame 92. The lever 111 has a slot 113 therein to receive a pin 114 which is fixed to one face of a lever 115 near the lower end thereof, and serves to support the lever 111. The lever 115 is pivotally mounted intermediate its ends on the stud 96 and is held in place thereon by a bowed spring 116. The latter has a "keyhole" slot 117, the larger portion of which will freely receive the head 118 on the end of stud 96 and the smaller portion of which is of less diameter than the head and adapted to fit in the circumferential groove 119 in stud 96. The spring 116 is put in place by slipping the larger part of slot 117 over head 118 and compressing the bowed spring 116 and then pushing it radially of the head 118 into the position shown in Fig. 5. The spring is then held against radial displacement by a small pin 120 passed through it and into lever 115. The lever 115, on its outer face and near the lower end thereof, has a projecting pin 121 which lies in the path of, and is adapted to be engaged by, either one of two abutments 122 and 123 fixed to the friction plate 100.

When the handle 99 was moved into the "Off" position shown in Fig. 5, the abutment 122 engaged pin 121 and moved lever 115 until the pin 114 engaged the right hand end of slot 113. Further clockwise movement of handle 99 is prevented by such engagement of pin 114 in slot 113 and it will be recalled that the hose nozzle 24, when in place on support 28, prevents counterclockwise movement of handle 99. The switch operating lever 111 is then held in the raised position illustrated and the motor switch is opened. When nozzle 24 is removed, handle 99 can move only in a counterclockwise direction and, when so moved, it will move abutment 122 away from pin 121 and abutment 123 toward the pin. No movement of levers 111 and 115 results until abutment 123 engages pin 121. During this interval the resetting of the register pointers is effected. Near the end of the movement of handle 99 in its counterclockwise stroke, abutment 123 will engage pin 121 and swing lever 115 in a clockwise direction moving pin 114 to the left in slot 113. During the first part of such movement of pin 114 in slot 113, the lever 111 is not lowered because the right hand part of slot 113 is concentric with stud 96. The remainder of the slot 113 is constructed as a cam and when pin 114 moves into it lever 111 is moved downwardly to close the motor switch. At the end of the switch closing movement, the parts are positioned as shown in Fig. 2. Handle 99 can move no further in a counterclockwise direction because pin 114 abuts the left hand end of slot 113. On a clockwise movement of the handle the abutment 122 will, near the end of the movement, engage pin 121 and swing lever 115 in a counterclockwise direction, moving pin 114 to the right in slot 113 and raising lever 111 to open the motor switch.

The lever 115 controls the engagement and disengagement of the clutch elements 84 and 87. It is shown in clutch engaging position in Figs. 5 and 4 and in clutch disengaging position in Figs. 2 and 3. The upper end of lever 115 is provided with a U-shaped part 124 which will, when the lever is moved into the position shown in Figs. 2 and 3, straddle the sleeve 89. One face of this part 124 is beveled to form a cam 125. As the lever 115 moves from the position shown in Fig. 4 to that shown in Fig. 3, the cam 125 will engage the hub of pinion 90 and force it toward frame 92, moving sleeve 89 and through the connections 88 (Fig. 7) moving shaft 86 in the proper direction to disengage the element 87 from element 84. The engagement of these elements is caused through the intermediary of spring 93. However, this spring does not of itself suffice for the purpose. It is not under tension when positioned as in Fig. 3. When the cam 125 moves from the position shown in Fig. 3 to that shown in Fig. 2, it first disengages from the hub of pinion 90 and then, by means of a projection 126, moves spring 93 and forces member 94 and thus sleeve 89 in a direction such as to engage the clutch elements. At the end of its stroke projection 126 engages a projection 127 on spring 93 and places the same under tension. The engagement of the clutch members is thus effected positively by lever 115 and yieldably because of the interposition of spring 93.

The lever 115 is also used to effect a slight movement of the resetting gearing in a direction opposite to that in which it is moved for resetting purposes. For this purpose, the lever carries a pawl 128 pivotally mounted on a stud 129. A spring 130 looped around this stud has one end engaged with a lug 131 on the lever 115 and the other end hooked over the pawl 128 so as to yieldingly urge the same toward gear 97. Adjustably mounted in lug 131 by the bolt and slot connection 132 is a finger 133 adapted, as shown in Fig. 5, to engage pawl 128 and hold it away from gear 97 when the lever 115 is in clutch engaging position. When lever 115 is moved out of such position, which occurs near the end of the register resetting operation, it swings in a clockwise direction. In the initial movement of lever 115 in such direction, the pawl 128 and abutment 133 which are then engaged, remain engaged until the pawl engages in the gear 97. This occurs during the travel of pin 114 in the dwell portion of slot 113. On continued movement of the lever the abutment 133 leaves the pawl and the latter, which is then engaged between two teeth of gear 97, is moved enough to cause a slight movement of the gear, say for example by an angular distance equal to one tooth. This occurs while pin 114 is travelling in the cam part of slot 113 and just prior to disengagement of the clutch elements. The purpose of this retrograde movement is to take the strain off all the parts of the transmission used for resetting. When the pointers are arrested by the zero stops described, the various parts in the resetting transmission can, on continued turning, be placed under some stress and, if under such stress, this stress would be relieved when the clutch elements are disengaged with the result that the pointers will jump away from zero position. The plan just described relieves the stress before the clutch elements are disengaged and avoids the undesirable jumping of the pointers away from zero position.

It is usually desired to have an audible signal associated with the registers and in Fig. 11 a bell 135 is shown for this purpose. Bell 135 is secured to the lower wall of housing 44 about midway between its ends and is sounded by a striker 136, operated from a cam 137 fixed to shaft 47. The striker 136 is carried by one end of an arm 138 which is pivotally connected at 139 to one end of an arm 140, pivoted at 141 to housing 44. A spring 142 connects the two arms 138 and 140 and normally holds the adjacent end surfaces 143 thereof in abutment and restrains movement of arm 138 on pivot 139. The cam follower is carried on the inner end of an arm 144 pivoted to arm 140 at 145 and having a lug 146 which abuts the arm 140 and prevents downward movement of arm 144 about pivot 145, but permits upward movement thereof. The arm 140 has an adjustable stop 147 which, by abutment with the back wall of housing 44, limits the extent of its swinging movement in a counter-clockwise direction. The cam 137 is constructed to gradually push arm 140 outwardly during the revolution of pointer 42 which is moved by shaft 47 and at the end of such revolution to suddenly release the cam follower and allow it to move inwardly. The weight of the arms 138 and 140 and of striker 136 cause them to move inwardly. At first both arms 138 and 140 move together but eventually arm 140 is arrested by stop 147 whereupon arm 138 continues in motion until the striker 136 engages the bell 135, the spring 142 yielding to permit this action.

It is usual to provide in connection with the registers heretofore described a totalizing register such as is indicated at 148 in Fig. 5. The indications of this register may be viewed through an opening 149 formed in the dial and back wall 38 of one of the large registers. Register 148 is driven from shaft 56 by intermeshing spiral gears 150 and 151 and to the latter is fixed a spur gear 152 which drives a gear 153 on the register. Register 148 and its driving means are encased in a housing 154, secured to the lower wall of housing 44.

The operation has been described in full detail in the preceding description and a brief summary of it at this point should suffice. The operator removes nozzle 24 from its support 28 prior to the dispensing operation. This releases handle 99 for movement. It can then be turned in one direction only, viz. clockwise as viewed in Fig. 9 and counterclockwise as viewed in Fig. 5. Movement in the other direction is prevented as heretofore described. Consequently, the operator must move the handle 99 in the planned direction and the motor switch cannot be closed until the handle is moved to the limit of its movement in this direction. The act of turning on the switch is thus utilized to insure resetting of the registers. This resetting occurs during so much of the first part of the movement of handle 99 as is necessary for the purpose. The handle operates gear 97 and this, through the gears 95 and 90, drives sleeve 89 which through the connections shown in Fig. 7 drives register shaft 47. The clutch elements 84 and 87 are then engaged and the motor switch is held open because the pin 114 is then engaged in the right hand part of the slot 113 in lever 111. Continued movement of handle 99 in the same direction causes the abutment 123 to engage pin 121 and shift lever 115 to disengage the clutch elements 84 and 87 and allow the register shafts 47 and 46 to be turned freely by the meter 19. This movement of lever 115 through pin 114 and the cam end of slot 113 moves lever 111 to close the motor switch. The dispensing operation then takes place in the usual way, the operator controlling the flow by the lever 25 of the nozzle valve and the quantities dispensed being indicated by the pointers 41 and 42 on the registers. At the end of the dispensing operation, the operator desires to hang up the hose nozzle. The only available place is the support 28. Handle 99 then prevents the placing of the nozzle on such support, thereby compelling the operator to restore handle 99 to the position shown in Figs. 5 and 9. Near the end of such movement of the handle the abutment 122 engages pin 121 and shifts lever 115 into the position shown in Fig. 5, thereby causing the clutch elements to be engaged and also causing the lever 111 to be lifted into position to open the motor switch. The nozzle may then be placed on support 29 and locked thereto if desired.

It will thus be seen that the operator cannot start the pump until the register has been reset. No resetting of the register can occur during operation of the pump because the closing of the motor switch causes the opening of the clutch in the transmission between the resetting means and the register drive shafts. After pumping is completed, the nozzle cannot be hung up nor can the pump be stopped until handle 99 is restored to its normal position. And in the act of stopping the pump and moving handle 99 into position to allow the nozzle to be placed on its support, the clutch in the transmission between the resetting means and register is closed, whereby should the operator again attempt to start the pump, the register would be reset before the switch of the pump motor can be closed.

An important feature of the invention consists of the means for preventing the pointers 41 and 42, after having been reset to zero position, from jumping away from such position when the clutch in the resetting transmission is disengaged. When the shafts 46 and 47 are moved during the resetting operation they are placed under some stress after their movement has been arrested by the stop 76. There is enough spring in the shafts and associated parts so that a stress is set up which is sufficient to cause the hands to jump slightly away from zero position when the clutch is disengaged. The customer naturally objects and feels that he is being cheated if the hands 41 and 42 are not exactly in zero position, wherefore it is most important to not only move the pointers to zero position but to prevent them from moving out of such position except when properly moved by the meter 19. The pawl 128, actuated as described by the movement of the clutch shifting lever 115, imparts a slight movement to gear 97 in a direction opposite to that in which it turns to effect resetting of the pointers and just prior to disengagement of the clutch. The retrograde movement of gear 97 is slight and just enough to take the strain off the parts and not enough to move the pointers away from zero position. The pointers therefore remain in their proper reset positions when the clutch is disengaged.

Another important feature of the invention relates to the improved interrelationship between the switch operating means and the clutch shifting means. It is most important for the full prevention of fraudulent operation of the apparatus that the pump motor be stopped before the clutch elements 87 and 84 are engaged. If these elements engage before the meter has stopped driving the pointers, the load of the transmission gearing is imposed on the pointer drive shaft 47 and this additional load will cause slippage in the friction clutches, such as 64, 68, which are interposed in the transmission between the meter and the pointers. The pointers could thus be stopped while the flow of liquid continued and liquid could, under some conditions of abnormal operation, be secured without registration of the quantity on the dial. For example, if the operator by careful manipulation of handle 99 could move it into a position such that the clutch elements 87 and 84 would engage and where the motor switch would be on, then liquid could be delivered without movement of the pointers. To absolutely prevent such fraudulent manipulation, the apparatus is so designed that the motor switch must be opened before the clutch elements can be engaged. In the arrangement illustrated, the lever 115 lifts the switch lever 111 upwardly by means of the pin 114 acting on the cam shaped part of slot 113. The lever does not disengage from the hub of pinion 90 until the switch lever is fully lifted. Usually there is some overtravel of the switch lever so that the motor switch actually opens before the lever is fully lifted. In any event, the lever 115 disengages from the hub of pinion 90 while pin 114 is travelling in the "dwell" portion of slot 113 and the clutch elements are not actually engaged until the lever 115 nears the very end of its travel and engages the projection 127 on spring 150

93. The engagement of the clutch elements is made to occur in the very last stage of movement of handle 99 and the arrangement insures that the motor switch is open before the clutch elements can be engaged.

The invention has been disclosed herein, in an embodiment at present preferred for illustrative purposes, but the scope of the invention is defined by the appended claims rather than by the foregoing description.

What I claim is:

1. In an apparatus of the class described, a delivery conduit, a meter interposed in said conduit having a register with a movable element driven by the meter to indicate the quantities of liquid forced therethrough, means for forcing liquid through said conduit and meter, a device to start and stop said forcing means, a control member movable from one position to another to actuate said device and start and stop said forcing means, transmission means between said member and said element for turning the element backward when said member is moved in the direction necessary to start said forcing means, cooperating clutch elements in said transmission, shifting means actuated by movement of said member to positively engage and positively disengage said clutch elements, and connections between said shifting means and device for interlocking them to positively compel their relative movements to occur in a predetermined sequence such that the clutch elements must be disengaged before said forcing means can be started and be engaged only after said forcing means has been stopped.

2. In apparatus of the class described, a liquid delivery conduit, a meter interposed in said conduit, means for forcing liquid through said conduit and meter, a register having a movable element to indicate the quantity of liquid measured by said meter, driving means between said meter and element including a slip connection enabling resetting of said element without operation of the meter, a control member manually movable back and forth through a predetermined range, a transmission between said member and driving means including a clutch, whereby movement of said member in one direction when the clutch is engaged will reset said element, a lever shiftable back and forth between two positions in one of which it is operable to start and in the other of which it is operable to stop said forcing means, a second lever shiftable back and forth between two positions in one of which it is operable to engage the clutch elements and in the other of which it is operable to disengage the clutch elements, means interlocking said levers and positively compelling their relative movements in predetermined sequence such as to compel the engagement of the clutch to occur only after said first named lever has been moved to stop said forcing means and to compel the disengagement of the clutch to occur before said first named lever is moved to start said forcing means, and means for actuating one of said interlocked levers from said control member so that the clutch is disengaged and the forcing means started when the member is moved to one end of said range and so that said forcing means is stopped and the clutch engaged when the member is moved to the other end of its range.

3. In apparatus of the class described, a liquid delivery conduit, a meter interposed in said conduit, means for forcing liquid through said conduit and meter, a register having a movable element to indicate the quantity of liquid measured by said meter, driving means between said meter and element including a slip connection enabling resetting of said element without operation of the meter, a control member manually movable back and forth through a predetermined range, a transmission between said member and driving means including a clutch, whereby movement of said member in one direction when the clutch is engaged will reset said element, a lever shiftable back and forth between two positions in one of which it is operable to start and in the other of which it is operable to stop said forcing means, a second lever shiftable back and forth between two positions in one of which it is operable to engage the clutch elements and in the other of which it is operable to disengage the clutch elements, means interlocking said levers and positively compelling their relative movements in predetermined sequence such as to compel the engagement of the clutch to occur only after said first named lever has been moved to stop said forcing means and to compel the disengagement of the clutch to occur before said first named lever is moved to start said forcing means, means for actuating one of said interlocking levers from said control member so that the clutch is disengaged and the forcing means started when the member is moved to one end of said range and so that said forcing means is stopped and the clutch engaged when the member is moved to the other end of its range, and a slip connection between said member and transmission enabling continued movement of the control member after the indicating element has been reset.

4. In an apparatus of the class described, a delivery conduit, a meter interposed in said conduit having a register with a movable element driven by the meter to indicate the quantities of liquid forced therethrough, means for forcing liquid through said conduit and meter, a device to start and stop said forcing means, a control member movable from one position to another to actuate said device and start and stop said forcing means, transmission means between said member and said element for turning the element backward when said member is moved in the direction necessary to start said forcing means, cooperating clutch elements in said transmission, and a lever for shifting said clutch elements and positively interlocked with said device to move back and forth relatively thereto in predetermined sequence such that the clutch elements will be disengaged before said forcing means can be started and again engaged only after said forcing means has been stopped, said lever provided with dual cam means one of which is operable to disengage the clutch elements and the other to engage the same.

5. In an apparatus of the class described, a delivery conduit, a meter interposed in said conduit having a register with a movable element driven by the meter to indicate the quantities of liquid forced therethrough, means for forcing liquid through said conduit and meter, a device to start and stop said forcing means, a control member movable from one position to another to actuate said device and start and stop said forcing means, transmission means between said member and said element for turning the element backward when said member is moved in the direction necessary to start said forcing means, cooperating clutch elements in said transmission, and shifting means actuated by movement of said member to disengage the clutch elements just prior to the starting of said forcing means and to engage them only after said forcing means is stopped, said shifting means including a cam member operable when such means is moved to one position to positively move the clutch elements the one relatively to the other out of engagement, said shifting means also including a second cam and a cooperating and fixedly supported resilient member operable when such means is moved to another position to engage said elements, said resilient member serving as a transmission between the second cam and clutch elements and ineffective of itself to engage the clutch elements.

6. In an apparatus of the class described, a delivery conduit, a meter interposed in said conduit having a register with a movable element driven by the meter to indicate the quantities of liquid forced therethrough, means for forcing liquid through said conduit and meter, a device to start and stop said forcing means, a control member movable from one position to another to actuate said device and start and stop said forcing means, transmission means between said member and said element for turning the element backward when said member is moved in the direction necessary to start said forcing means, cooperating clutch elements in said transmission, and shifting means actuated by movement of said member to disengage the clutch elements just prior to the starting of said forcing means and to engage them only after said forcing means is stopped, said shifting means including a cam member operable when such means is moved to one position to positively move the clutch elements the one relatively to the other out of engagement, one of said clutch elements being movable axially toward and away from the other and provided with a grooved clutch collar, said shifting means including a forked member movable into and out of the groove in said collar and the forked member having a cam surface to cooperate with one face of said collar and move it axially to cause disengagement of the clutch elements, said shifting means also including a stationary but resilient forked member having one end disposed in the groove in said collar and adapted to cooperate with the other face thereof, said forked member having a cam effective when the forked member is entirely disengaged from said collar to deflect the resilient member and cause it to move the clutch collar to engage the clutch elements.

7. In an apparatus of the class described, a register having a movable indicating element, a meter, a transmission from the meter to said element for moving the latter, said transmission including sections interconnected by a slip connection enabling one section to be turned with said element and the latter moved back to zero position without moving the other section and the meter, resetting means for turning the first named section to reset the element to zero position, said means including a clutch, a zero stop to limit the return movement of said pointer by the resetting means, means for disengaging said clutch after the element has been reset to zero, and means operable after the resetting of said element and prior to the disengagement of said clutch to impart a sufficient movement to the first named section in a direction opposite to that in which it is moved by the resetting means to relieve any stress in said section and prevent said element from springing away from zero position when said clutch is disengaged.

8. In apparatus of the class described, a liquid delivery conduit, a meter interposed in said conduit, means for forcing liquid through said conduit and meter, a register having a movable element to indicate the quantity of liquid measured by said meter, driving means between said meter and element including a slip connection enabling resetting of said element without operation of the meter, a control member manually movable back and forth through a predetermined range, a transmission between said member and driving means including a clutch, whereby movement of said member in one direction when the clutch is engaged will reset said element, said transmission also including a toothed wheel and a frictional connection for driving it from said member, a clutch shifting means positively actuated by said member to engage the clutch near one end of said range and disengage the clutch at the other end of said range, and a pawl carried by said shifting means and actuated thereby prior to disengagement of the clutch to engage said wheel and turn it a short distance in a direction opposite to that in which it is turned by said member to reset said element.

9. In apparatus of the class described, a liquid delivery conduit, a meter interposed in said conduit, means for forcing liquid through said conduit and meter, a register having a movable element to indicate the quantity of liquid measured by said meter, driving means between said meter and element including a slip connection enabling resetting of said element without operation of the meter, a control member manually movable back and forth through a predetermined range, a transmission between said member and driving means including a clutch, whereby movement of said member in one direction when the clutch is engaged will reset said element, said transmission also including a toothed wheel and a frictional connection for driving it from said member, a clutch shifting means positively actuated by said member to engage the clutch near one end of said range and disengage the clutch at the other end of said range, and a pawl carried by said shifting means and actuated thereby prior to disengagement of the clutch to engage said wheel and turn it a short distance in a direction opposite to that in which it is turned by said member to reset said element, a lever to start and stop said forcing means, a cam and cam follower one on said lever and the other on said shifting means for operating the lever from the shifting means and causing the lever to be moved to stop said forcing means prior to the engagement of said clutch and causing the lever to be moved to start said forcing means after said clutch has been engaged.

WARREN H. DE LANCEY.